United States Patent [19]

Ohtsuka et al.

[11] Patent Number: 5,070,979

[45] Date of Patent: Dec. 10, 1991

[54] VISCOUS COUPLED FLY WHEEL

[75] Inventors: Kiyoaki Ohtsuka; Isao Hirota, both of Tochigi, Japan

[73] Assignee: Tochigifujisangyo Kabushiki Kaisha, Japan

[21] Appl. No.: 397,644

[22] Filed: Aug. 22, 1989

Related U.S. Application Data

[63] Continuation of Ser. No. 126,848, Nov. 30, 1987, abandoned.

[30] Foreign Application Priority Data

| Dec. 4, 1986 | [JP] | Japan | 61-186077[U] |
| Jan. 6, 1987 | [JP] | Japan | 62-000071[U] |
| Jan. 6, 1987 | [JP] | Japan | 62-000072[U] |
| Jan. 6, 1987 | [JP] | Japan | 62-000073[U] |
| Jan. 6, 1987 | [JP] | Japan | 62-000144 |

[51] Int. Cl.$^5$ ............................ F16D 43/20; F16D 3/80
[52] U.S. Cl. ................................. 192/54; 74/574; 192/58 C; 464/24
[58] Field of Search .............. 192/58 C, 57, 0.032, 192/0.034, 54; 74/574; 464/24

[56] References Cited

U.S. PATENT DOCUMENTS

| 3,404,585 | 10/1968 | Roper | 192/58 C X |
| 4,250,983 | 2/1981 | Handke | 192/58 C X |
| 4,682,678 | 7/1987 | Kussel et al. | 192/56 F |
| 4,683,998 | 8/1987 | Cigdem et al. | 192/58 C |
| 4,690,258 | 9/1987 | Teraoka et al. | 192/58 C |
| 4,739,866 | 4/1988 | Reik et al. | 192/70.17 |

FOREIGN PATENT DOCUMENTS

| 2483649 | 12/1981 | France | 192/0.032 |
| 204320 | 12/1982 | Japan |  |
| 204348 | 12/1982 | Japan |  |
| 0920299 | 4/1982 | U.S.S.R. | 464/24 |

OTHER PUBLICATIONS

"Development of Engine Flywheel with Torsional Damper", Katou et al., *Automobile Technique*, No. 12, pp. 1428-1432, 12/85.

*Primary Examiner*—Rodney H. Bonck
*Attorney, Agent, or Firm*—Samuels, Gauthier & Stevens

[57] ABSTRACT

A flywheel comprises first and second members disposed on the sides of an engine and a transmission and rotatable relative to each other; a sealed chamber disposed between the first and second members and filled with a viscous fluid; a plurality of resistance plates disposed within the sealed chamber and alternately engged with the first and second members; a detector for detecting a drive torque transmission; and a device for engaging the first and second members with each other based on the detection of the drive torque by the detecting means. The flywheel may comprise an operating device for increasing a torque transmitted between the resistance plates based on the detection of the drive torque by the detector. The flywheel may comprises a movable member disposed between the first and second members and engagable with one of the first and second members; a plurality of resistance plates disposed within the sealed chamber and engaged with the movable member and one of the first and second members in the rotational direction; and a cam disposed between the movable member and one of the first and second members, and engaging the movable member with the one of the first and second members in the rotational direction. The cam axially moves the movable member by a relative displacement between the first and second members.

13 Claims, 13 Drawing Sheets

VISCOUS COUPLED FLY WHEEL

This is a continuation of copending application Ser. No. 07/126,848 filed on Nov. 30, 1978 now abandoned.

The present invention relates to a flywheel, and particularly, to a flywheel having an engine side member and a transmission side member.

BACKGROUND OF THE INVENTION

A conventional flywheel is disclosed in AUTOMOBILE TECHNIQUE No. 12, pages 1428 to 1432 published by the Automobile Technical Association Corporation of Japan in 1985 for example. This flywheel is called a flywheel with a torsional damper and comprises a member on the side of an engine, a member on the side of a transmission, a compression spring, a hysteresis mechanism, a bearing for smoothly operating a damping member, and a limit torque mechanism for supressing an excessive torque generated when the flywheel is actuated.

The compression spring is flexed in accordance with the amount of an output torque of the engine, and in this state, a variable torque is absorbed by the compression spring and the hysteresis mechanism so that the member on the transmission side is rotated by a rotational amount damped and varied with respect to the member on the engine side, thereby transmitting an averaged torque to a drive system.

However, in the structure mentioned above, when the spring constant of the compression spring is increased, the variable torque can be absorbed without completely flexing the compression spring even when a large torque is transmitted, but the variable torque cannot be absorbed when a small torque is transmitted, e.g., when a vehicle is stopped in an idling state. When the spring constant of the compression spring is decreased, the variable torque can be absorbed when a small torque is transmitted, but when a large torque is transmitted, the compression spring is completely flexed so that the variable torque cannot be absorbed.

To solve these problems, a new system has been proposed in which a viscous coupling is disposed between a member on the engine side and a member on the transmission side so that the variable torque can be absorbed when relatively large and small torques are transmitted.

In the flywheel using such a viscous coupling, resistance plates are alternately engaged with the member on the engine side and the member on the transmission side, respectively, and are disposed within a sealed chamber formed between both members and filled with a viscous fluid such as silicon oil. Accordingly, when the resistance plates are rotated by the rotation of the member on the engine side, the connected to the transmission side member resistance plates are rotated through the viscous resistance of the viscous fluid, thereby transmitting the torque to member on the transmission side. The variable torque on the engine side is damped by the viscous fluid between the resistance plates so that the above-mentioned operation can be performed, whereby the variable torque can be absorbed when both large and small torques are transmitted. However, when the transmission torque capacity of the viscous coupling is set to be a value at which the variable torque can be absorbed even when a small torque is transmitted, the difference in the number of rotations between the member on the engine side and the member on the transmission side is increased when a large torque is transmitted, thereby reducing the torque transmission efficiency and increasing the fuel cost and further reducing the performance of the viscous coupling by wear of the resistance plates, etc.

In general, in a power transmission system disposed in a vehicle and provided with a flywheel rotated by source of an engine or the like, a vibration is generated in the power transmission system on an output side including an output shaft, the chassis, etc., when rapid variations in torque and the number of rotations of an input shaft are directly transmitted to the output shaft, thereby making it uncomfortable to ride in the vehicle.

To solve such problems, another type of conventional flywheel has been proposed examples of which can be found in Japanese Laid-Open Patents 57-204320 and 57-204348.

In this flywheel, a sealed chamber filled with a viscous fluid is disposed between an engine side member and a transmission side member. A plurality of resistance plates alternately combined with each other are disposed within the sealed chamber and are movable in the axial direction and are respectively engaged with the engine side member and the transmission side member, thereby constituting a viscous coupling. Further, an engaging device is disposed to vary the distance between the resistance plates by a biasing member biased in accordance with the increase or decrease of the number of rotations thereof. Thus, the torque transmission efficiency by the viscous resistance of the viscous fluid is made large, and a vibration caused by rapid variations in the number of rotations and torque is prevented from being generated in the case of low rotational speeds in which the generation of the vibrations is especially a problem. A sufficient torque can be obtained in the case of high rotational speeds.

Further, such a flywheel has a joint of a viscous fluid therein for relaxing rapid variations in the number of rotations of an input shaft and drive torque, thereby preventing vibration from being generated in a power transmission system.

In such a flywheel, rotary plates rotated by the joint the viscous fluid joint approach each other by force imparted from a movable member moved by a centrifugal force as the number of rotations of the flywheel is increased, thereby increasing the transmitted torque. Accordingly, in the case of low rotational speed of the flywheel in which the generation of vibration is especially a problem, the generation of vibration in the power transmission system is greatly reduced with respect to the rapid variations in the number of rotations of the flywheel and torque. In the case of high rotational speed of the flywheel, power can be transmitted at a high efficient rate.

However, in the conventional flywheel mentioned above, the transmitted torque is changed by the variation of the number of rotations of the flywheel, so sufficient power cannot be obtained when a large torque is needed at a low rotational speed in running states of a vehicle on a road having a bad condition, a steeply inclined road, etc.

Moreover, in such a flywheel, when the transmission torque capacity of the viscous coupling is set to be a value for enabling the variable torque to be absorbed even when a small torque is transmitted, the number of differential rotations between the engine side member and the transmission side member is increased when a large torque is transmitted, thereby increasing the fuel cost by the viscous differential rotation at the running time of the vehicle.

SUMMARY OF THE INVENTION

To overcome the problems mentioned above, an object of the present invention is to provide a flywheel for absorbing a variable torque when both relatively large and small torques are transmitted, while preventing the fuel cost from being increased.

Another object of the present invention is to provide a flywheel which can relax rapid changes in the number of rotations of an input member and drive torque, which can prevent the generation of vibration in a power transmission system, and which can supply a sufficient power even when a large torque is needed at a low rotational speed.

Another object of the present invention is to provide a flywheel with a simple structure for absorbing a variable torque even when a small torque is transmitted, and absorbing a variable torque at engine idling time, while preventing the fuel cost from being increased.

Another object of the present invention is to provide a flywheel for absorbing a variable torque when both relatively large and small torques are transmitted, and improving the torque transmission efficiency and preventing the increase of the fuel cost and wear of resistance plates.

With the above objects in view, in accordance with one embodiment of the present invention, a flywheel comprises a member on the side of an engine and a member on the side of a transmission rotatable with respect to each other, a sealed chamber disposed between these members and filled with a viscous fluid therebetween, a plurality of resistance plates respectively engaged with these members within the sealed chamber in the rotational direction and alternately arranged in proximity to each other, means for detecting a drive torque of the flywheel, and means for engaging these members with each other based on the detection of the drive torque by the detecting means.

In accordance with the construction of the flywheel mentioned above, when a torque having a value less than a predetermined value is transmitted, the power from the member on the engine side is transmitted to the member on the transmission side by the viscous resistance of the viscous fluid within the sealed chamber due to the differential between the resistance plates, and any vibration of the flywheel generated by a variable torque can be damped and absorbed by the viscous resistance of the viscous fluid within the sealed chamber. When the transmission torque is greater than the predetermined value, the detecting means detects this state so that the engaging means engages the member on the engine side with the member on the transmission side, thereby transmitting the torque therebetween.

In another embodiment of the present invention, the engaging means comprises an electromagnet. In accordance with this embodiment, the power from the engine side member is transmitted to the transmission side member by the viscous resistance of the viscous fluid within the sealed chamber by the differential between the resistance plates. Any vibration generated by the variation of the torque is damped and absorbed by the viscous resistance of the viscous fluid within the sealed chamber. When the transmitted torque is greater than a predetermined value, the state is detected by the detector so that the electromagnet as the engaging means connects the engine side member to the transmission side member to transmit the torque therebetween.

In another embodiment of the present invention, a flywheel comprises a member on the side of an engine and a member on the side of a transmission rotatable relative to each other; a sealed chamber disposed between the engine side member and the transmission side member and filled with a viscous fluid; a plurality of resistance plates disposed within the sealed chamber and alternately engaged with the engine side member and the transmission side member; means for detecting a drive torque transmitted from the engine through the flywheel to the transmission; and operating means for increasing a torque transmitted between the resistance plates based on the detection of the drive torque by the detecting means.

In this structure of the present invention, when the drive torque, etc., are rapidly changed, a slip is generated between the resistance plates respectively engaged with the engine side member and the transmission side member, thereby relaxing rapid variations of the drive torque, etc. Further, even when the number of rotations of the flywheel is low, the drive torque is detected by the detecting means when the drive torque is large, and the operating means increases the transmitted torque between the resistance plates based on the detection of the detecting means, thereby providing a sufficient power when a large torque is needed at a low rotational speed.

In another embodiment of the present invention, the detecting means has a compression spring disposed between the sealed chamber and either the engine side member or the transmission side member. The compression spring is also flexed by a variable torque, thereby absorbing the variable torque in a wide range.

In another embodiment of the present invention, a flywheel comprises an engine side member and a transmission side member rotatable relative to each other; a sealed chamber disposed between the engine side member and the transmission side member and filled with a viscous fluid; a movable member disposed between the engine side member and the transmission side member and frictionally engagable with one of the engine side member and the transmission side member by the axial movement of the movable member; a plurality of resistance plates engaged with the movable member and one of the engine side member and the transmission side member and alternately arranged in proximity to each other; and cam means disposed between the movable member and the one of the engine side member and the transmission side member and engaging the movable member with the one of the engine side member and the transmission side member in the rotational direction, the cam means axially moving the movable member by a relative displacement between the engine side member and the transmission side member due to an engine drive torque.

In the flywheel mentioned above, when the transmitted torque is less than a predetermined value such as at engine idling time, the power from the engine side member is transmitted to the transmission side member by the viscous resistance of the viscous fluid between the resistance plates, and any vibration generated by the variation of the torque is damped and absorbed by the viscous resistance of the viscous fluid within the sealed chamber. When the transmitted torque is greater than the predetermined value, the movable member is moved by the action of the cam means and is frictionally engaged with one of the engine side member and the transmission side member, thereby transmitting the torque without the viscous fluid.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will now be described with reference to the drawings.

Figure 1:
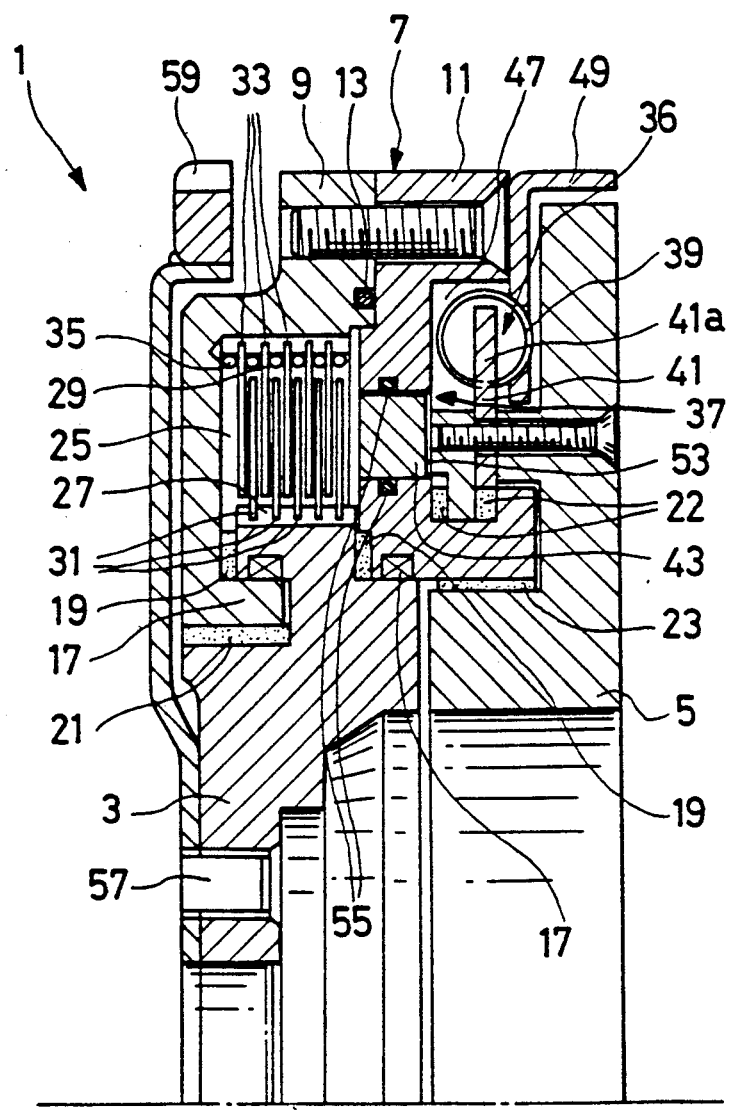
FIG. 1 is a sectional view showing a radial portion of a flywheel in a first embodiment of the present invention.

In FIG. 1, a flywheel 1 for a vehicle for example comprises a member 3 on the side of an engine, a member 5 on the side of a transmission, and an intermediate member 7 disposed between the members 3 and 5. The intermediate member 7 is formed by a disc 9 on the engine side and on the side of the member 3, and a disc 11 on the transmission side and on the side of the member 5. The discs 9 and 11 are fixed to each other through a seal member 13 interposed between the opposing surfaces thereof. The intermediate member 7 is rotatably supported on the circumferential surface of the engine side member 3 relative to the engine side member 3 through a bearing 17 and seals 19 and 21. The intermediate member 7 is rotatably connected to the transmission side member 5 through another bearing and seal 22 and 23.

A sealed chamber 25 is formed between the engine side member 3 and the intermediate member 7, and is filled with a viscous fluid. Splines 27 and 29 are formed on the outer circumferential surface of the engine side member 3 and the inner circumferential surface of the engine side disc 9 of the intermediate member 7 within the sealed chamber 25, and are alternately engaged with a plurality of resistance plates 31 and 33 in proximity to each other, respectively. The resistance plates 31 and 33 are rotated relative to each other together with the engine side member 3 and the intermediate member 7. Elastic bodies or rings 35 are disposed between the respective resistance plates 33 and 33.

A detector 36 detects a drive force transmitted from the engine through the flywheel 1 to the transmission. An engaging device 37 engages the engine side member 3 with the intermediate member 7 based on the detection of the detector 36. The detector 36 and the engaging device 37 are disposed between the intermediate member 7 and the transmission side member 5. The detector 36 is composed of a compression spring 39 and an engaging ring 41 engagable with the compression spring 39. The engaging device 37 is composed of a movable member 43 disposed in the transmission side disc 11 and movable into the sealed chamber 25, and a cam surface 45 disposed between the movable member 43 and the transmission side member 5 as shown in FIG. 2.

Figure 3:
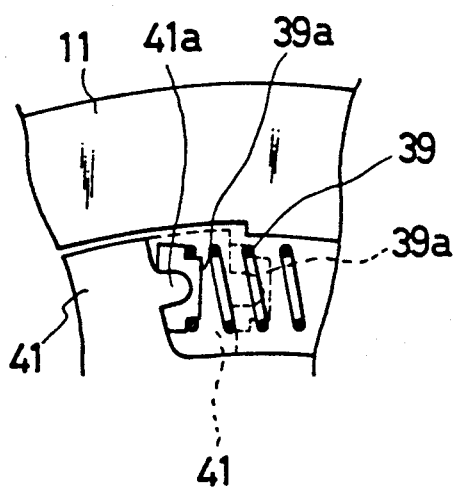
FIG. 3 is a partially sectional view showing an engaging state between a compression spring and an engaging ring.

As shown in FIGS. 1 and 3, the compression spring 39 comprises a coil spring and is disposed within a clearance 47 formed between the transmission side disc 11 of the intermediate member 7 and a disc 49 fixed to the transmission side disc 11, and can be biased in the circumferential direction. The compression spring 39 is held at both ends thereof by the disc 49 through an engaging member 39a. The engaging ring 41 fixed to the transmission side member 5 is engaged with the engaging member 39a in an engaging portion 41a thereof, and is disposed within the clearance 47. The compression spring 39 is compressed in proportion to the amount of drive torque between the intermediate member 7 and the transmission side member 5.

The movable member 43 is inserted into a hole 53 extending through the transmission side disc 11, and is slidable within the hole 53 into and away from the sealed chamber 25. Seal member 55 are fixed to a portion of the disc 11 forming the circumferences of the hole 53.

Figure 2:
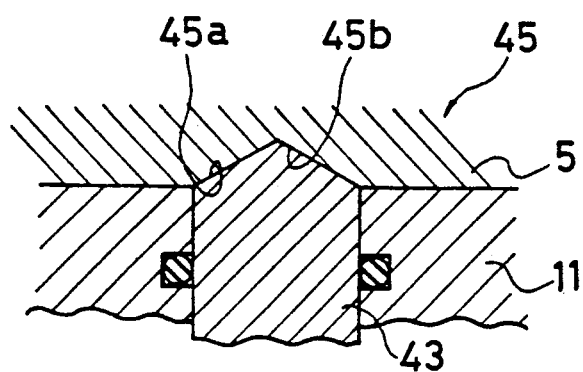
FIG. 2 is a sectional view of cam surfaces of a member on the side of a transmission and a movable member.

As shown in FIG. 2, the cam surface 45 is formed by a projected surface 45a and a recessed surface 45b fitted to the projected surface 45a. The projected surface 45a may be formed in one of the movable member 43 and the transmission side member 5, and the recessed surface 45b may be formed in the other of the movable member 43 and the transmission side member 5.

The engine side member 3 is connected to a ring gear 59 when the flywheel 1 is connected to an output shaft of the engine.

The operation of the flywheel in the first embodiment of the present invention constituted above will now be described.

The engine side member 3 and the resistance plates 31 are rotated by the power transmitted from the engine through a crankshaft to the engine side member 3 so that the resistance plates 33 are also rotated by the viscous resistance of the viscous fluid generated by the rotation of the resistance plates 31, thereby rotating the transmission side disc 11 engaged with the resistance plates 33. Accordingly, the torque is transmitted from the disc 49 fixed to the transmission side disc 11 through the compression spring 39 to the engaging ring 41 fixed to the transmission side member 5. Any vibration generated by variation of the torque is damped and absorbed by the viscous fluid between the resistance plates 31 and the resistance plates 33 disposed within the sealed chamber 25, thereby preventing the vibration from being transmitted on the transmission side.

When the drive torque is greater than a predetermined value, the compression spring 39 is flexed and a relative displacement is generated between the transmission side member 5 and the intermediate member 7 so that the movable member 43 is moved into the sealed chamber 25 by the action of the cam surface 45. Thus, the pressure within the sealed chamber 25 is increased by the movement of the movable member 43 into the sealed chamber 25, thereby increasing the transmitted torque capacity between the resistance plates 31 and 33 through the viscous fluid. When the drive torque is further increased, the movable member 43 is further moved into the sealed chamber 25 so that the resistance plates 31 are coupled to the resistance plates 33 and a slip therebetween is stopped. Accordingly, the differential between the engine side member 3 and the transmission side member 5 is restricted so that the engine side member 3, the intermediate member 7 and the transmission side member 5 are integrally rotated with each other, thereby transmitting the torque from the engine side member 3 to the transmission side member 5. In this case, the variable torque is absorbed by the compression spring 39.

Figure 5:
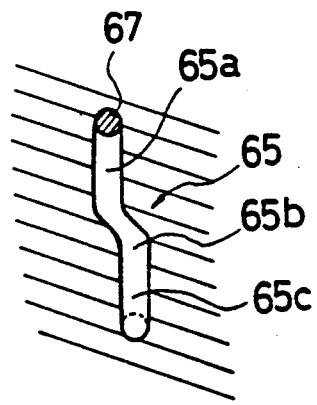
FIG. 5 is a sectional view taken along Line V—V of FIG. 4 in the second embodiment of the present invention.
Figure 4:
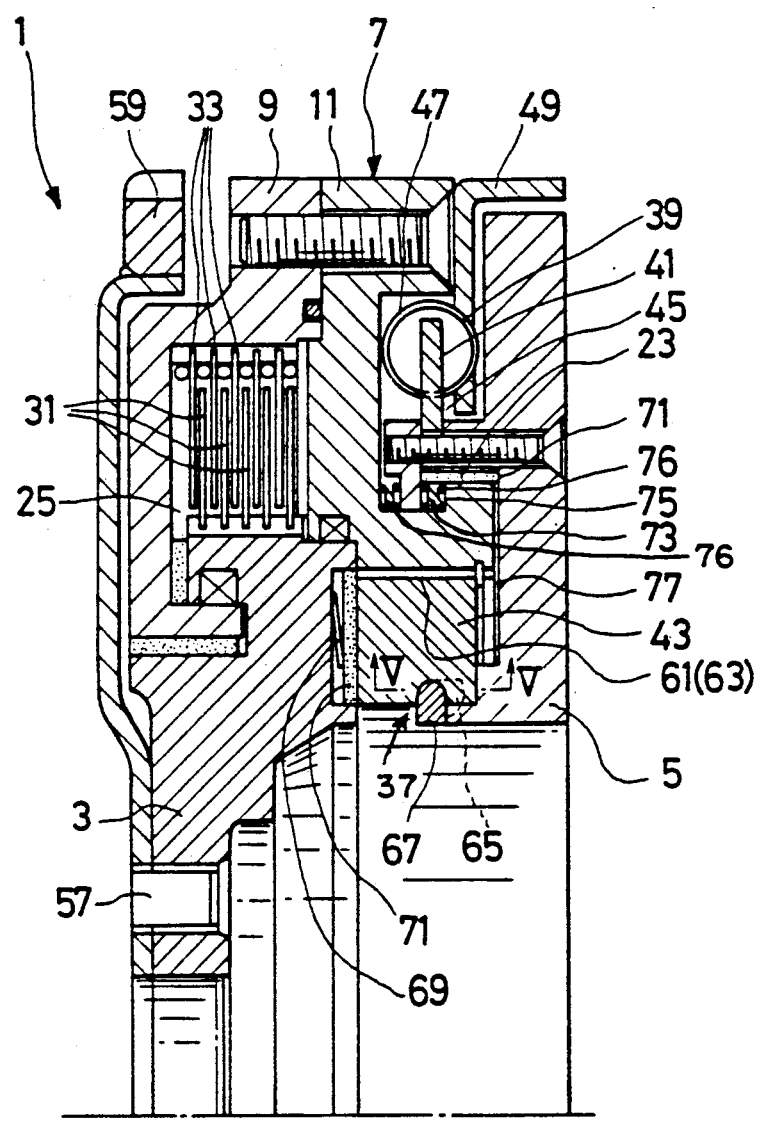
FIG. 4 is a sectional view of the radial portion in a second embodiment of the present invention.

FIGS. 4 and 5 show a second embodiment of a flywheel in the present invention in which an engine side member 3 can be directly connected to a transmission side member 5 by an engaging device 37 which again includes a movable member 43. A spline 61 is formed in the outer circumference of the movable member 43 and is engaged with a spline 63 formed in the inner circumference of an intermediate member 7 and is axially movable between the engine side member 3 and the transmission side member 5. As shown in FIG. 5, a guide groove 65 is circumferentially formed in the inner surface of the movable member 43 and is bent in the axial direction and is further extended in the radial direction. A guide pin 67 is movably inserted into the guide groove 65 and is attached to the transmission side member 5. The guide groove 65 is formed by a releasing portion 65a on the side of the engine side member 3, a pressing portion 65c on the side of the transmission side member 5, and a slanted communicating portion 65b for communicating the releasing portion 65a with the pressing portion 65c. When the guide pin 67 is located in the releasing portion 65a, the movable member 43 is moved away from the engine side member 3. When the guide pin 67 is moved from the releasing portion 65a through the communicating portion 65b to the pressing portion 65c, the movable member 43 is moved toward the engine side member 3. A leaf spring 69 and a frictional plate 71 are disposed between the engine side member 3 and the movable member 43, and can absorb an impact force therebetween, and prevent a slip therebetween. A projected portion 73 is formed on the transmission side member 5 and is located within a clearance 45. The projected portion 73 is elastically supported by springs 75 and 76 arranged on opposite sides thereof to bear respectively against the transmission side member 5 and the intermediate member 7. In FIGS. 4 and 5 showing the second embodiment of the present invention, the same or corresponding portions as the ones of FIGS. 1 to 3 are designated by the same reference numerals.

In this second embodiment of the present invention, when a drive torque is greater than a predetermined value, compression spring 39 is flexed and a relative displacement is generated between the engine side member 3 and the transmission side member 5 so that the guide pin 67 is moved from the releasing portion 65a through the communicating portion 65b to the pressing portion 65c within the guide groove 65. The movable member 43 is moved by the movement of the guide pin 67 in a direction in which the movable member 43 approaches the engine side member 3. By this movement of the movable member 43, the leaf spring 69 and the frictional plate 71 are pressed and the movable member 43 is pressed by the engine side member 3, thereby engaging the engine side member 3 with the intermediate member 7. Thus, the engine side member 3, the intermediate member 7 and the transmission side member 5 are integrally rotated with each other, and the power is transmitted from the engine side member 3 through the compression spring 39 to the transmission side member 5. Accordingly, the slip is restricted when the drive torque is greater than the predetermined value, thereby reducing the fuel cost. In this case, a variable torque is absorbed in a wide range by the compression spring 39 since the compression spring is further compressed. Further, when a large torque is applied to the flywheel even at a low rotational speed, the above operation is also performed so that the flywheel can be sufficiently operated in a running state of a vehicle on a road having a bad condition or a steep incline.

A restricting spring 77 restricts the movement of the movable member 43 on the side of the transmission side member 5.

Figure 6:
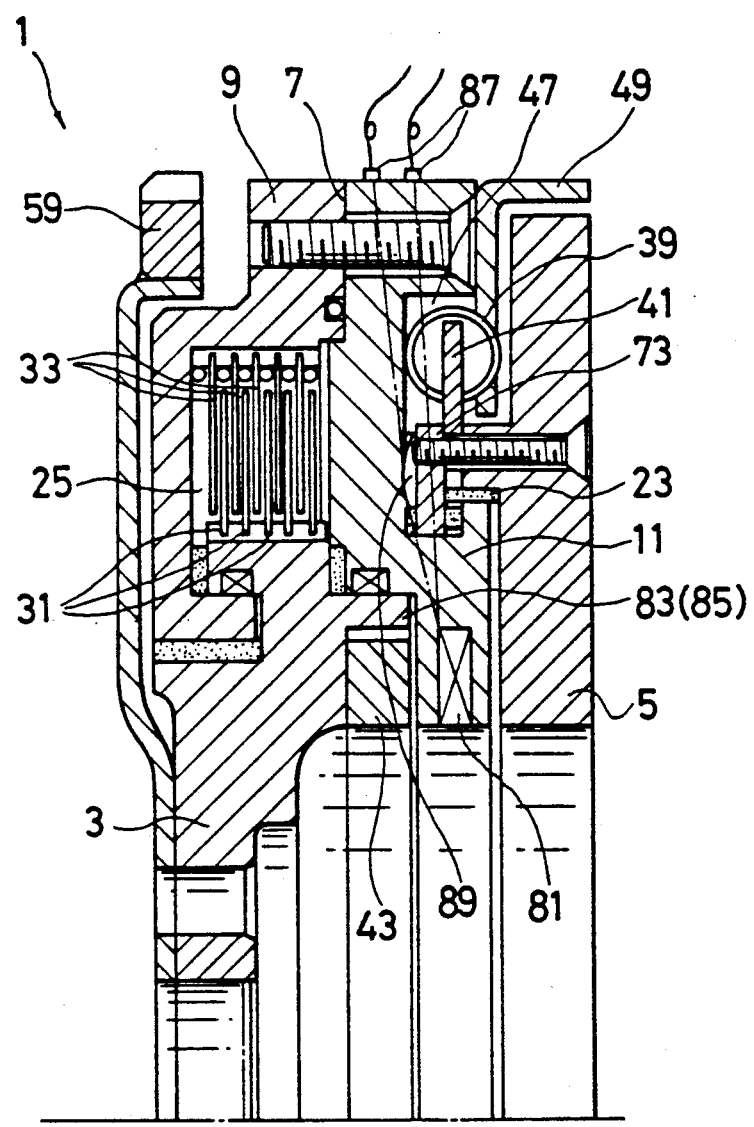
FIG. 6 is a sectional view of the radial portion in a third embodiment of the present invention.

FIG. 6 shows a third embodiment of the present invention in which a movable member 43 is moved by using a magnetic force of an exciting coil 81 to engage an engine side member 3 with an intermediate member 7 and disengage the engine side member 3 from the intermediate member 7. A spline 83 is formed in the outer circumference of the movable member 43, and is engaged with a spline 85 formed in the inner circumference of the engine side member 3, and is movable in the axial direction. The exciting coil 81 is disposed in a portion of the transmission side member 5 facing the movable member 43. Slip rings 87 are connected to a battery, and a switch 89 turns on and off the exciting oil 81 attached to the intermediate member 7 within a clearance 47 by detecting a relative displacement between the intermediate member 7 and the transmission side member 5. A rear portion of the switch 89 is adapted to be biased by an elastic member. In FIG. 6, the same or corresponding portions as the ones of FIGS. 1 to 3 are designated by the same reference numerals.

In this third embodiment of the present invention shown by FIG. 6, when a drive torque is greater than a predetermined value, a compression spring 39 is flexed and a relative displacement is generated between the intermediate member 7 and the transmission side member 5 so that the switch 89 is turned on and the exciting coil 81 is excited. Accordingly, the movable member 43 is moved toward the transmission side disc 11 and is engaged with the transmission side disc 11 so that a slip between the resistance plates 31 and 33 is stopped, thereby integrally rotating the engine side member 3, the intermediate member 7 and the transmission side member 5.

Figure 7:
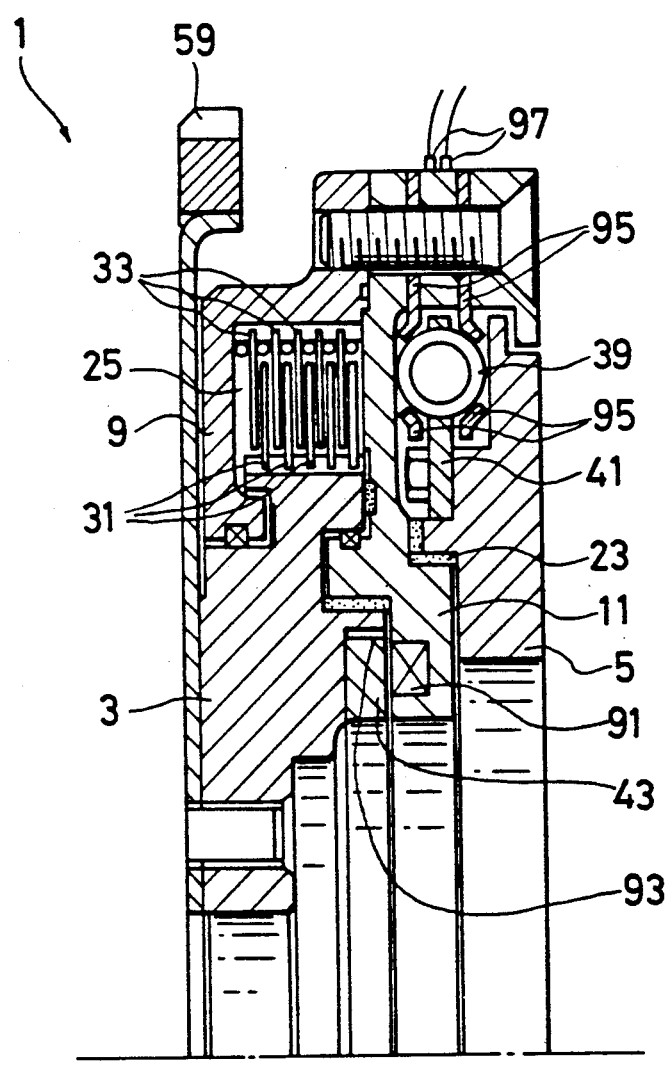
FIG. 7 is a sectional view of the radial portion in a fourth embodiment of the present invention.
Figure 8:
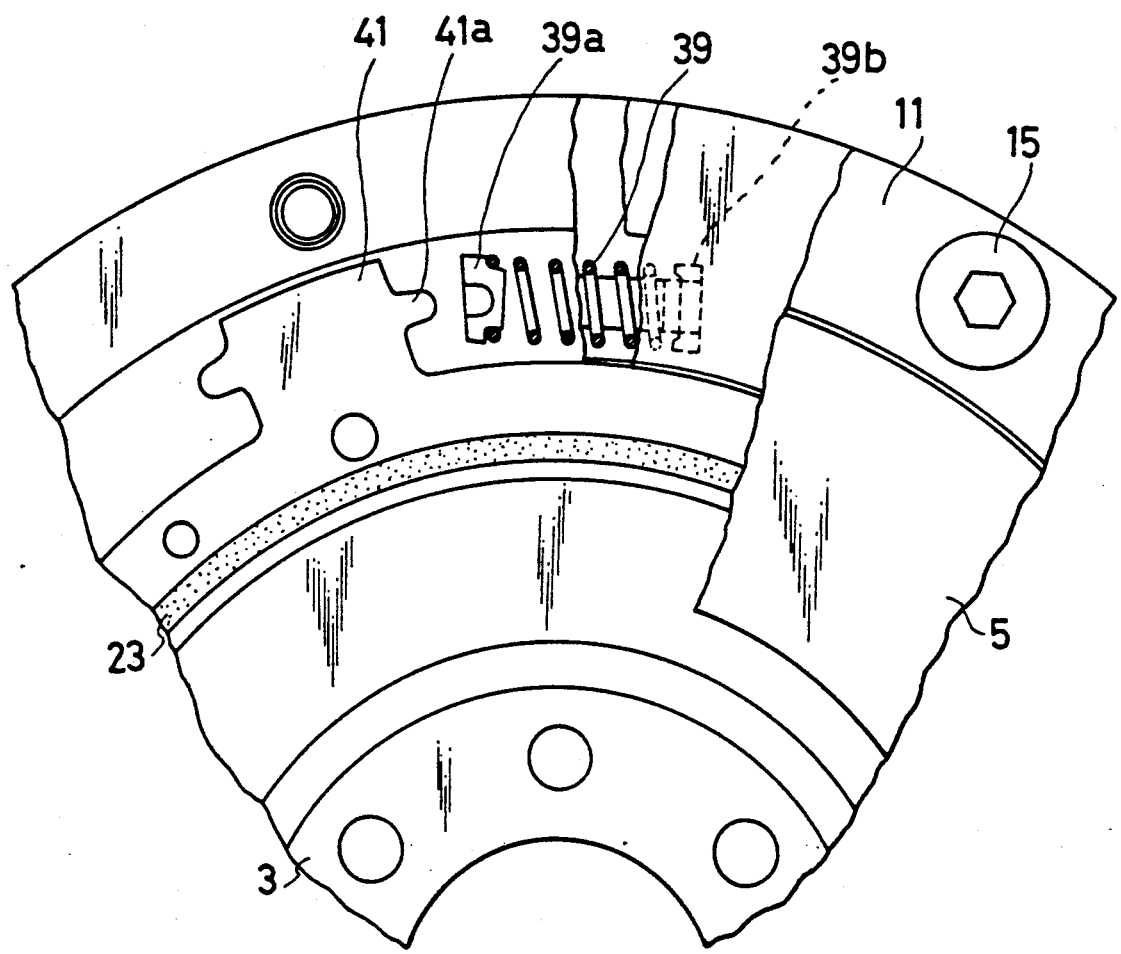
FIG. 8 is a partially broken front view of the radial portion of FIG. 7.
Figure 9:
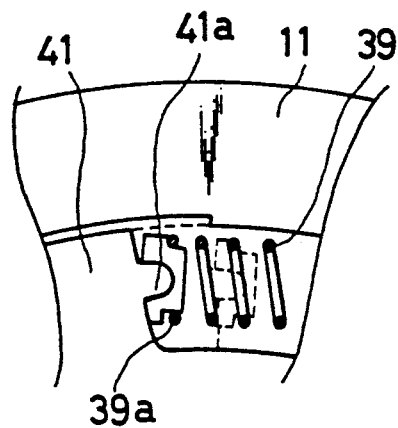
FIG. 9 is a partially front view showing the engaging state between the compression spring and the engaging ring in FIG. 7.

FIGS. 7 to 9 show a fourth embodiment of the present invention. In this embodiment, a compression spring 39 is compressed or extended by engaging an engaging portion 39a fixed to the compression spring 39 with an engaging portion 41a of an engaging ring 41 so that an exciting coil 91 is turned on and off and a movable member 43 is guided and moved along a spline 93 in the axial direction, thereby engaging an engine side member 3 with a transmission side disc 11 and disengaging the engine side member 3 from the transmission side disc 11. In FIG. 9, dotted line shows an ON state in which the compression spring 39 is flexed and has reached the compressed limit thereof, and solid line shows an OFF state in which the compression spring 39 is extended. A support member 95 supports the compression spring 39 and is fixed to the intermediate member 7. A slip ring 97 is connected to a battery.

Figure 10:
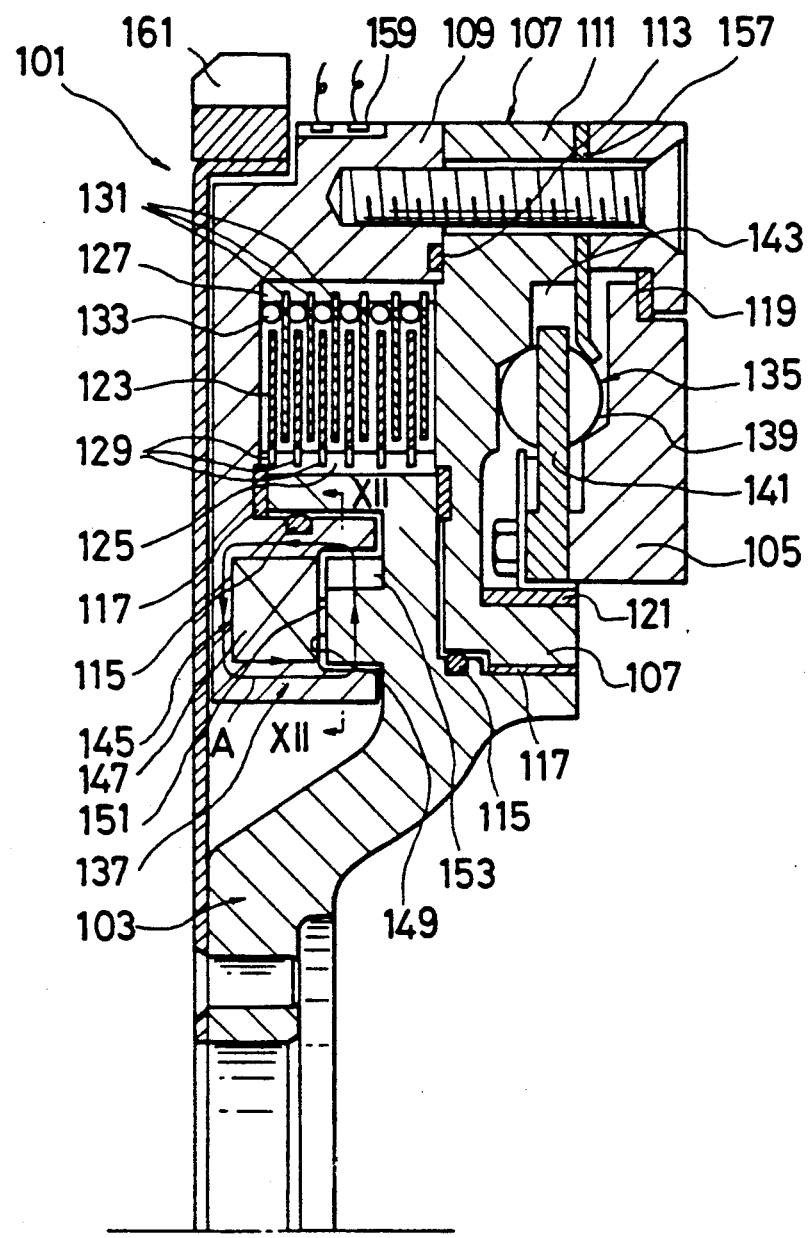
FIG. 10 is a sectional view of the radial portion in a fifth embodiment of the present invention.
Figure 11:
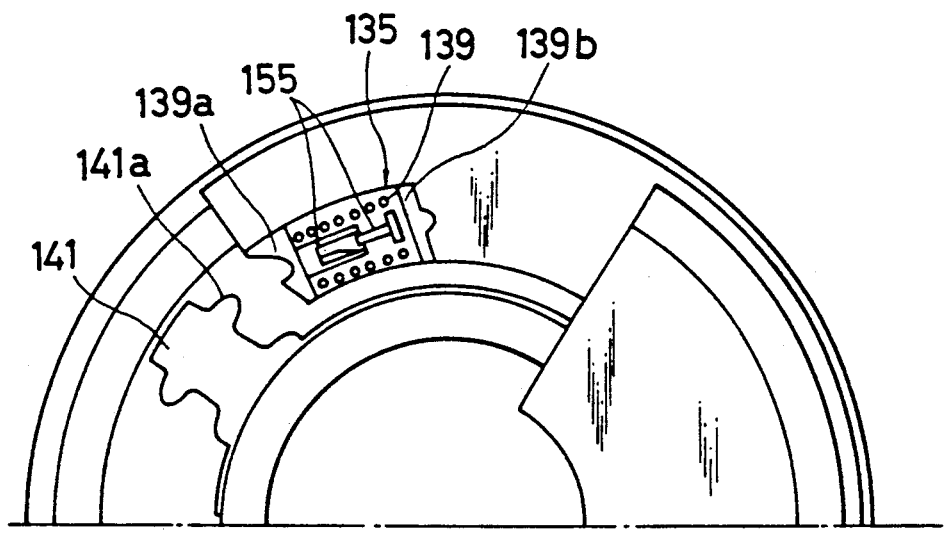
FIG. 11 is a partial front view showing the contact switch for activating the exciting coil shown in FIG. 10.
Figure 12:
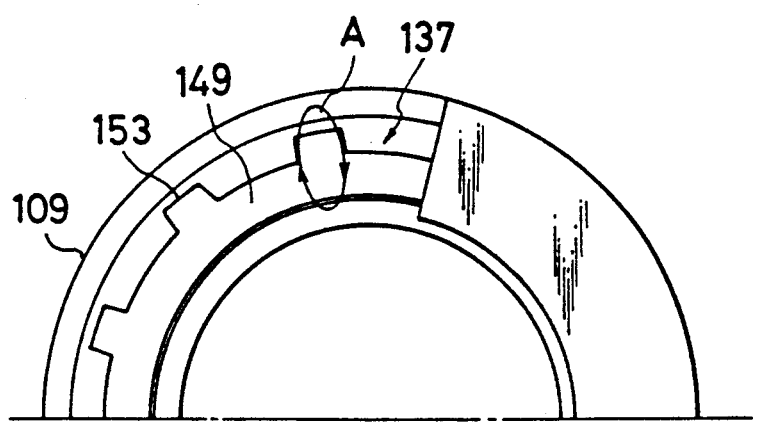
FIG. 12 is a sectional view taken along Line XII—XII of FIG. 10 and showing the generation of the magnetic loop between the ring gear and the member on the engine side.

FIGS. 10 to 12 show a fifth embodiment of the present invention. In this embodiment, an intermediate member 107 is rotatably supported on the circumference of an engine side member 103 relative to the engine side member 103 through a seal member 115 and bearing members 117. The right side of the intermediate member 107 in FIG. 10 is rotatable relative to the transmission side member 105 through bearing members 119 and 121.

A sealed chamber 123 is formed between the engine side member 103 and the intermediate member 107 and is filled with a viscous fluid. Splines 125 and 127 are formed within the sealed chamber 123 on the outer circumference of the engine side member 103 and the inner circumference of an engine side disc 109 of the intermediate member 107, and are alternately engaged with a plurality of resistance plates 129 and 131 respectively in proximity to each other. The resistance plates 129 and 131 are relatively rotated together with the engine side member 103 and the intermediate member 107. Spacer rings 133 are disposed between the respective resistance plates 131.

A detector 135 detects a drive force transmitted from an engine through a flywheel 101 to a transmission, and an engaging device 137 engages the engine side member 103 with the intermediate member 107 based on the detection of the drive force by the detector 135. The detector 135 and the engaging device 137 are disposed between the intermediate member 107 and the transmission side member 105.

The detector 135 is composed of a compression spring 139 and an engaging ring 141 engagable with the compression spring 139. The compression spring 139 is composed of a coil spring as shown in FIG. 11, and is located in a clearance 143 formed between a transmission side disc 111 of the intermediate member 107 and the transmission side member 105, and can be biased in the circumferential direction. The compression spring 139 is engaged with the engaging ring 141 and a support member 157 of the transmission side disc through engaging members 139a and 139b.

The engaging ring 141 fixed to the transmission side member 105 is engaged with the engaging member 139a in an engaging portion 141a thereof, and the compression spring 139 is compressed in proportion to the amount of the drive torque transmitted between the intermediate member 107 and the transmission side member 105.

In the engaging device 137, an exciting coil 147 constituting an electromagnet 145 is attached to an engine side disc 109 which is the intermediate member 107. A flange portion 149 projected from the engine side member 103 is disposed to oppose the exciting coil 147, and is inserted into a groove 151 disposed in the engine side disc 109 with a slight play. Further, a plurality of spiders 153 are radially formed in the outer circumference of the flange portion 149. When the exciting coil 147 is excited, a magnetic path A is formed, and the intermediate member 107 and the engine side member 103 are integrally rotated.

As shown in FIG. 11, a switch 155 is disposed within the compression spring 139 at both ends thereof, and has contact elements for turning on and off the exciting coil 147. The contact elements of the switch 155 contact each other to turn on and off the exciting coil when the compression spring 139 is flexed and has reached the compressed limit thereof. A slip ring 159 is connected to a battery. A ring gear 161 is disposed in the engine side member 103 to start the flywheel.

In the structure mentioned above, a power is transmitted from the engine through a crankshaft to the engine side member 103, and the resistance plates 129 are rotated by the power together with the engine side member 103. Further, the resistance plates 131 is integrally rotated by the viscous resistance of the viscous fluid generated by the rotation of the resistance plates 129, thereby rotating the transmission side disc 111 fixed to the engine side disc 109 engaged with the resistance plates 131. Accordingly, the torque is transmitted from the transmission side disc 111 through the compression spring 139 to the engaging ring 141 fixed to the transmission side member 105. A vibration generated by the variation of the torque is damped and absorbed by the viscous fluid between the resistance plates 129 and 131 disposed within the sealed chamber 123, thereby preventing the vibration from being transmitted onto the transmission side.

When the drive torque is greater than a predetermined value, the compression spring 139 is flexed and a relative displacement is generated between the intermediate member 107 and the transmission side member 105 so that the contact elements of the switch 155 contact each other to turn on the switch and excite the exciting coil 147. A magnetic path A is formed between the engine side disc 109 and the spider 153 disposed in the flange portion 149 by the excitation of the exciting coil 147. By the formation of the magnetic path A, an alternating magnetic field is generated in the spider 153 and the engine side disc 109, thereby generating an eddy current therein. The engine side disc 109 of the intermediate member 107 is integrally rotated by the eddy current together with the engine side member 103. Accordingly, the power is transmitted from the engine side member 103 through the compression spring 139 to the transmission side member 105.

The exciting coil 147 and the flange portion 149 of the engine side member 103 are held in a state in which they do not contact each other so that the exciting coil 147 is not damaged by friction.

When the drive torque is greater than the predetermined value, the engine side member 103 is coupled to the transmission side member 105 by the electromagnetic force so that a sufficient power can be obtained even in the low engine speed and the high torque. Further, there is no differential within the sealed chamber 123, and the sealed chamber 123 is not damaged by high pressure, and the resistance plates 129 and 131 are prevented from being worn.

As mentioned above, in accordance with the present invention, the transmitted torque capacity of a viscous fluid joint is set to be a value for enabling a variable torque to be absorbed at the times of idling and low drive torque. When the drive torque is greater than a predetermined value, an engine side member and a transmission side member are integrally rotated through a compression spring. Accordingly, a large torque can be transmitted between the engine side member and the transmission side member, and the acceleration and the fuel cost are improved while the variable torque can be absorbed.

Further, in accordance with the present invention, the variation of the drive torque at the times of engine idling, etc., can be relaxed by a slip between the resistance plates, thereby preventing vibration generated in the power transmission system. When the torque is large even in the low rotational force input to the engine side member, the engaging device engages the engine side member with the transmission side member based on the detection of the torque by the torque detector so that the flywheel can provide a sufficient power at the low rotational speed and large torque. Further, since a compression spring disposed in the torque detector can be also flexed by the variable torque, the variable torque can be absorbed in a wide range.

Further, in the present invention, the variation of a torque at engine idling time, etc., can be relaxed by a slip between the resistance plates, thereby preventing a vibration in the power transmission system. Even when the rotational force input to the engine side member is at the low rotational speed, the torque is detected by the torque detector when the torque is large, so that the engine side member and the transmission side member are engaged with each other by an electromagnet, thereby providing a sufficient power at the low rotational speed and large torque. Further, the resistance plates are prevented from being worn since the resistance plates are not engaged with the engine side member and the transmission side member.

Further, when the electromagnet is used to engage the engine side member with the transmission side member, a control circuit may be disposed to provide an electromagnetic force in accordance with the transmitted torque by inputting a signal obtained by the torque detector to an operating device. In this case, the engine side member and the transmission side member can be controlled by the control circuit from their completely connected state to a semi-clutched state by the electromagnetic force.

Figure 13:
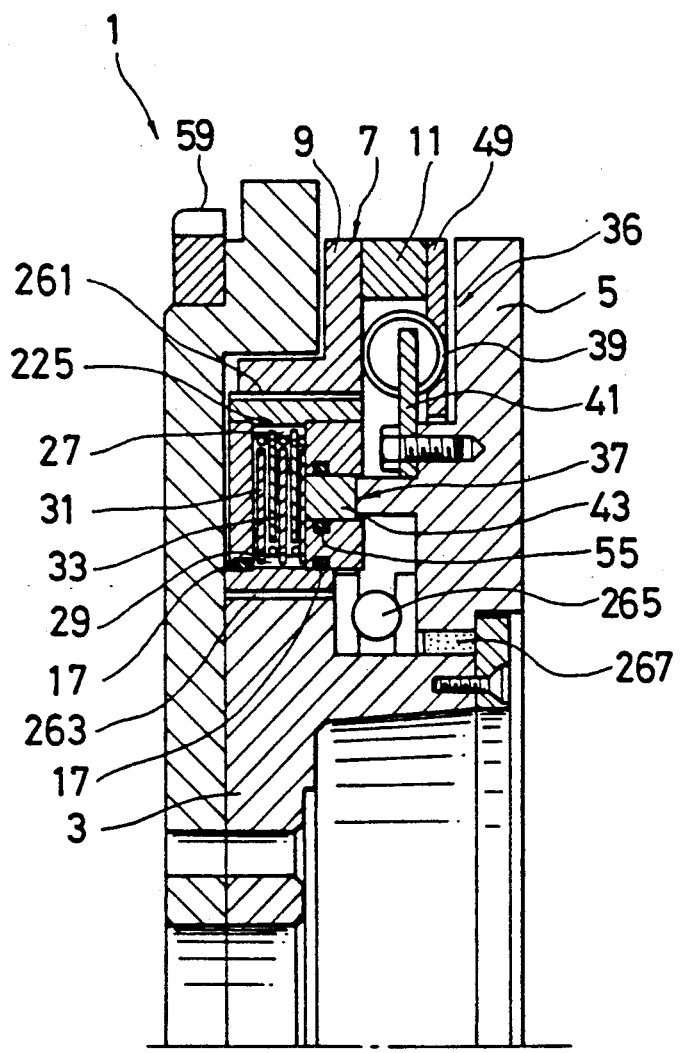
FIG. 13 is a sectional view of a flywheel in a sixth embodiment of the present invention.

FIG. 13 shows another embodiment of the present invention in which the same or corresponding portions as the ones of FIG. 1 are designated by the same reference numerals. In this embodiment, the capacity of an engine side member 3 is increased to increase the moment thereof at the start of the engine, which is advantageous in starting. A sealed chamber 225 is separately formed and thereafter is assembled with splines 261 and 263, improving the assembled operation. Further, a thrust roller bearing 265 is used between the engine side member 3 and a transmission side member 5, thereby preventing burning therebetween by the thrust force transmitted from a clutch. In addition, bearing members 267 are disposed between the engine side member 3 and the transmission side member 5.

In the above embodiment, rapid variations of a drive torque, etc. are relaxed by a slip between resistance plates of the engine side member and the resistance plates of the transmission side member, thereby preventing vibration generated in the power transmission system. Further, even when the rotational force input to the engine side member is in the low speed state, the operating device can increase the transmitted torque between the resistance plates based on the detection of the drive torque by the detector when the torque is large, thereby sufficiently providing a large torque at the low rotational speed.

FIGS. 14 to 20 show another embodiment of the present invention. In a flywheel 301 shown in FIG. 14, a movable member 307 is disposed between an engine side member 303 and a transmission side member 305, and a viscous coupling 309 is disposed between the movable member 307 and the engine side member 303. A cam device 311 is disposed between the movable member 307 and the transmission side member 305, and the transmission side member 305 is rotatable relative to the engine side member 303 through a bearing 313.

In the viscous coupling 309, a sleeve 319 is fitted to the inner circumferential surfaces of flanges 317 integrally disposed at both ends of an outer cylinder 315 inserted and fixed to the engine side member 303. A sealed chamber 323 is formed by seal members 321 disposed in the flanges 317 and is filled with a viscous fluid. Splines 325 and 327 are respectively formed on the inner circumferential surface of the outer cylinder 315 and the outer circumferential surface of the sleeve 319 forming the sealed chamber 323. A plurality of resistance plates 329 and 331 are alternately arranged in proximity to each other and are engaged with the splines 325 and 327, respectively. A spline 333 is formed on the inner circumferential surface of the sleeve 319 and is engaged with a spline 335 disposed on the outer circumferential surface of the movable member 307 movable in the axial direction. The engine side member 303 and the movable member 307 are rotated relative to each other through the respective resistance plates 329 and 331. Spacer rings 337 are disposed between the respective resistance plates 329 and 331.

A cam device 311 is disposed between the movable member 307 and the transmission side member 305 to engage them with each other in the rotational direction. In the cam device 311, as shown in FIG. 3, a plurality of semicircular grooves 339 are radially disposed on the inner circumferential surface of the movable member 307, and hold a ball member 341 such as a steel ball having approximately the same radius as the one of the semicircular grooves 339.

Figure 14:
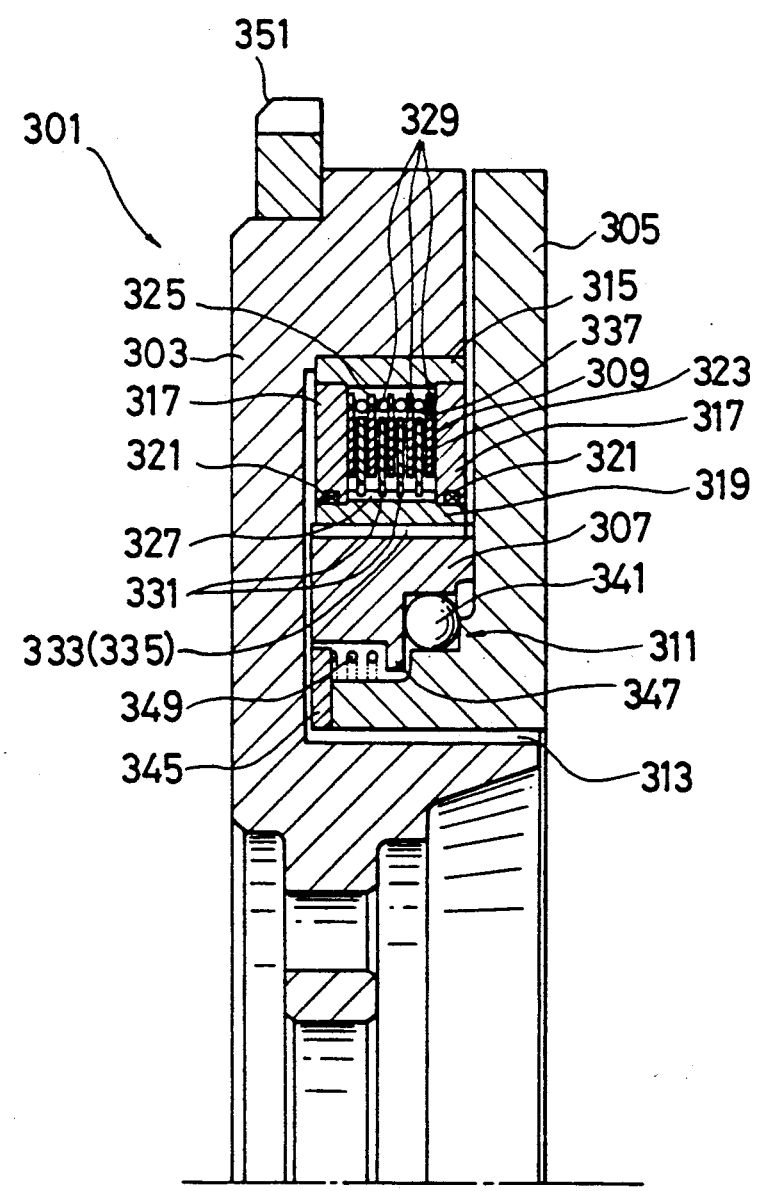
FIG. 14 is a sectional view of a radial portion of a flywheel in a seventh embodiment of the present invention.
Figure 15:
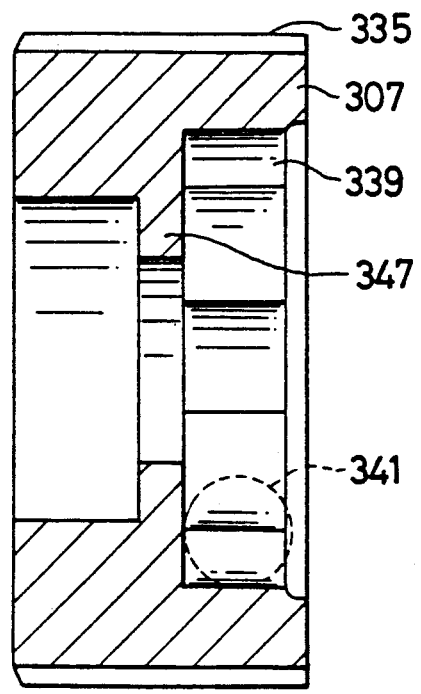
FIG. 15 is a sectional view of a movable member in the flywheel of FIG. 14.
Figure 16:
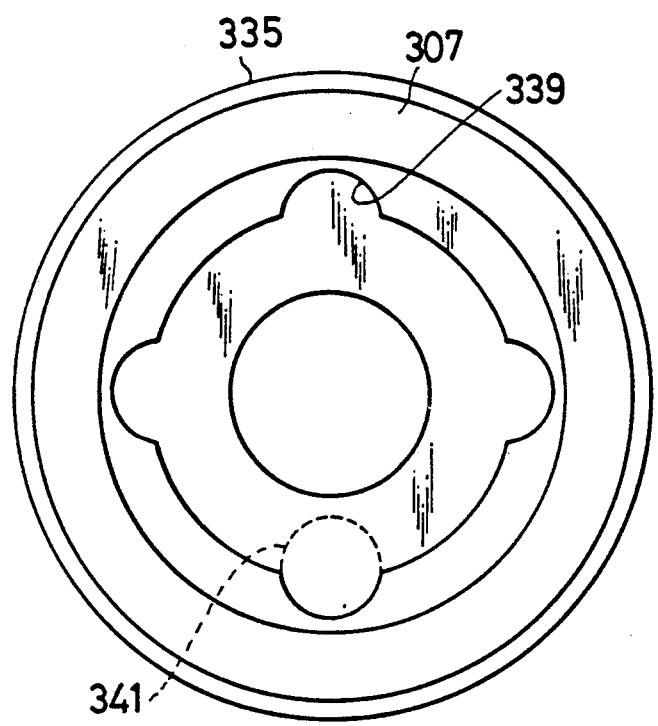
FIG. 16 is a front view of the movable member of FIG. 15.
Figure 17:
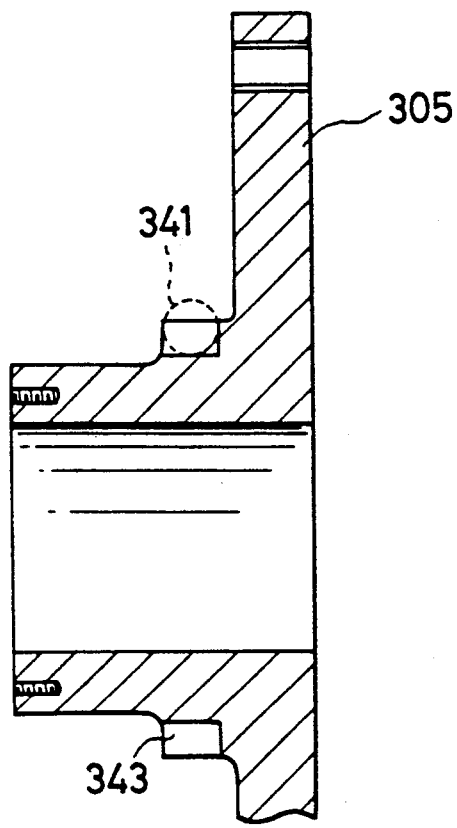
FIG. 17 is a partially sectional view of a transmission side member in the flywheel of FIG. 14.
Figure 19:
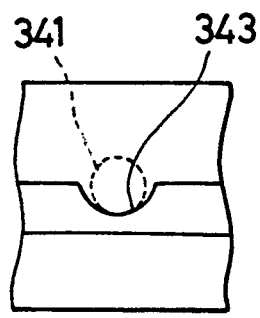
FIG. 19 is a partially sectional view taken along Line XIX—XIX of FIG. 18.
Figure 18:
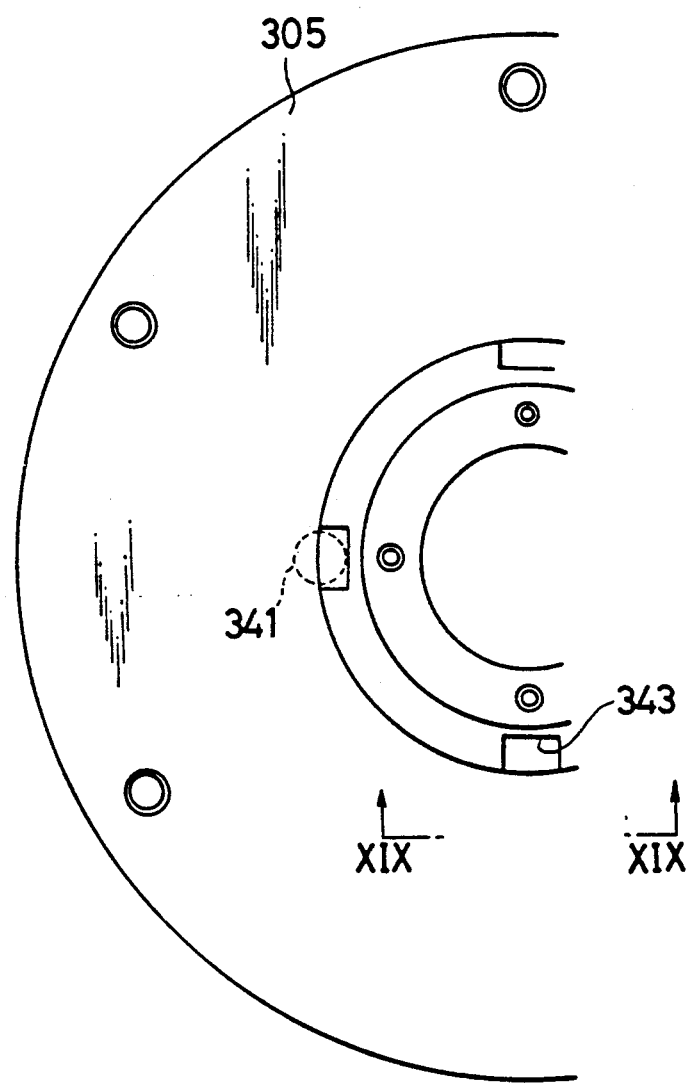
FIG. 18 is a partially front view of the transmission side member of FIG. 17.

As shown in FIG. 19, semicircular grooves 343 are disposed in the transmission side member 305, and open in the axial direction in a position opposite to the semicircular grooves 339, and have cam surfaces having a radius larger than the one of the ball member 341. The transmission side member 307 is engaged with the movable member 307 in a state in which the transmission side member 307 can be slightly moved in the circumferential direction through the ball member 341. Further, a flange 345 is integrally disposed at one end of the transmission side member 305 such as the left end thereof as shown in FIG. 14. A spring 349 is disposed between the flange 345 and a projected portion 347 projected to the inner circumferential surface of the movable member 307 so that the ball member 341 is held between the movable member 307 and the transmission side member 305, and the movable member 307 contacts a side portion of the transmission side member 305. A ring gear 351 is fixed to the engine side member 303 to start the flywheel.

The operation of the flywheel constructed above will now be described.

When a power is transmitted from an engine through a crankshaft to the engine side member 303, the resistance plates 329 are rotated by the power together with the engine side member 303, and the resistance plates 331 are integrally rotated by the viscous resistance of the viscous fluid generated by the rotation of the resistance plates 329. Thus, the movable member 307 is rotated through the sleeve 319 engaged with the resistance plates 331. A torque is transmitted by the rotation of the movable member 307 to the transmission side member 305 through the ball member 341. A vibration generated by a variable torque, when a small torque is transmitted such as at engine idling time, is damped and absorbed by the viscous fluid between the resistance plates 329 and 331 disposed within the sealed chamber 323, thereby preventing the vibration from being transmitted on the transmission side.

When a drive torque is greater than a predetermined value, a relative displacement is caused between the movable member 307 and the transmission side member 305 so that the ball member 341 is displaced along the inner circumferences of the semicircular grooves 343 having a large radius in the transmission side member 305, thereby pressing and engaging the movable member 307 with a side portion of the engine side member 303 against the elastic force of the spring 349. Thus, the engine side member 303 and the transmission side member 307 are integrally rotated with each other so that the power is directly transmitted from the engine side member 303 to the transmission side member 305. Accordingly, there is no differential between the resistance plates 329 and 331 except for at engine idling time, improving the fuel cost.

As mentioned above, in the present invention, a transmission torque capacity of a viscous joint is set to be a value for enabling a variable torque to be absorbed when a drive torque is small and an engine is in idling state. When the drive torque is greater than the predetermined value, the engine side member and the transmission side member are integrally rotated with each other through a movable member. Accordingly, a large torque can be transmitted and the fuel cost is improved. Further, when the movable member is combined with a cam device, the structure is made simple and compact.

What is claimed is:

1. A flywheel for transmitting torque from a drive shaft of an engine to a transmission, comprising:
    a first member adapted to be connected to the drive shaft;
    a second member adapted to be connected to the transmission; and intermediate member disposed between said first and second members, said intermediate member being connected to said second member and being rotatable with respect to said first member;
    a sealed chamber provided between said first and intermediate members and filled with viscous fluid;
    a plurality of first resistance plates disposed within said sealed chamber and connected to said first member;
    a plurality of second resistance plates disposed within said sealed chamber and connected to said intermediate member, said second resistance plates being arranged in an alternating order with said first resistance plates;
    means for detecting a drive torque transmitted from the engine through the flywheel to the transmission; and
    means for connecting said first member and said intermediate member when the detected drive torque reaches a predetermined value.

2. The flywheel of claim 1, wherein said connecting means comprises a moveable member formed with a cam surface slidably connected to said intermediate member and engageable with said first member via said resistance plates when the detected drive torque reaches a predetermined value.

3. The flywheel of claim 2, wherein said connecting means further comprises a mechanical means for applying a force to the moveable member so as to engage the movable member with said first member when the detected drive torque reaches the predetermined value.

4. The flywheel of claim 3, wherein said intermediate member is connected to said second member though a compression spring, the compression spring being compressed in proportion to the amount of drive torque transmitted from said intermediate member to said second member.

5. The flywheel of claim 4, wherein the mechanical means comprises a guide groove formed in the movable member and a guide pin formed on said second member and extending into the guide groove, the groove being formed with a releasing portion, a pressing portion and a communicating portion that communicates the releasing portion with the pressing portion, and the guide pin being moved within the guide groove in response the compression of the compression spring such that when the detected torque is below the predetermined value the pin will lie within the releasing portion, thereby keeping the movable member in a disengaged state, and such that when the detected drive torque rises above the predetermined value the pin will pass through the communicating portion and into the pressing portion, thereby engaging the movable member with said first member.

6. The flywheel of claim 1, wherein said connecting means comprises a movable member slidably connected to said first member and engageable with said intermediate member.

7. The flywheel of claim 6, wherein said connecting means further comprises an electromagnet.

8. The flywheel of claim 7, wherein said detecting means comprises a compression spring.

9. The flywheel of claim 8, wherein an exciting coil generates a force that causes the movable member to engage with said intermediate member when the detected drive torque reaches the predetermined value.

10. The flywheel of claim 1, wherein said detecting means comprises a compression spring.

11. The flywheel of claim 6, wherein said connecting means further comprises a movable member slidably connected to said first member and engageable with said intermediate member; and an exciting coil associated with said intermediate member for engaging said first member with said intermediate member via said movable member when the detected drive torque reaches a predetermined value.

12. The flywheel of claim 11, wherein said intermediate member is connected to said second member through a compression spring, the compression spring being compressed in proportion to the amount of drive torque transmitted from said intermediate member to said second member.

13. A flywheel for transmitting torque from a drive shaft of an engine to a transmission, comprising:
- a first member adapted to be connected to the drive shaft;
- a second member adapted to be connected to the transmission; and intermediate member disposed between said first and second members, said intermediate member being connected to said second member through a compression spring and being rotatable with respect to said first member, the compression spring being compressed in proportion to the amount of drive torque transmitted from said intermediate member to said second member;
- a sealed chamber provided between said first and intermediate members and filled with viscous fluid;
- a plurality of first resistance plates disposed within said sealed chamber and connected to said first member;
- a plurality of second resistance plates disposed within said sealed chamber and connected to said intermediate member, said second resistance plates being arranged in an alternating order with said first resistance plates;
- means for detecting a drive torque transmitted from the engine through the flywheel to the transmission; and
- means for connecting said first member and said intermediate member when the detected drive torque reaches a predetermined value, said connecting means comprising a movable member slidably connected to said intermediate member and engageable with said first member, and further comprising mechanical means for applying a force to the movable member so as to engage the movable member with said first member when the detected drive torque reaches the predetermined value, said mechanical means comprising a guide groove formed in the movable member and a guide pin formed on said second member and extending into the guide groove, the groove being formed with a releasing portion, a pressing portion and a communicating portion that communicates the releasing portion with the pressing portion, and the guide pin being moved within the guide groove in response the compression of the compression spring such that when the detected torque is below the predetermined value the pin will lie within the releasing portion, thereby keeping the movable member in a disengaged state, and such that when the detected drive torque rises above the predetermined value the pin will pass through the communicating portion and into the pressing portion, thereby engaging the movable member with said first member.

* * * * *